United States Patent [19]
Koo

[11] Patent Number: 5,172,232
[45] Date of Patent: Dec. 15, 1992

[54] METHOD AND APPARATUS FOR COMMUNICATION CHANNEL IDENTIFICATION AND SIGNAL RESTORATION

[75] Inventor: David Koo, Briarcliff Manor, N.Y.

[73] Assignee: North American Philips Corporation, New York, N.Y.

[21] Appl. No.: 820,437

[22] Filed: Jan. 9, 1992

Related U.S. Application Data

[63] Continuation of Ser. No. 693,737, Apr. 30, 1991, Pat. No. 5,111,298, which is a continuation-in-part of Ser. No. 595,112, Oct. 9, 1990, Pat. No. 5,047,859.

[51] Int. Cl.$^5$ .............................................. H04N 7/08
[52] U.S. Cl. ................................... 358/187; 358/139; 358/167; 358/905; 375/13; 375/19; 455/65; 455/67.1
[58] Field of Search ............... 358/139, 905, 187, 167; 375/13, 15, 19; 455/65, 67

[56] References Cited

U.S. PATENT DOCUMENTS

| | | | |
|---|---|---|---|
| 4,864,403 | 9/1989 | Chao | 358/167 |
| 4,897,725 | 1/1990 | Tanaka et al. | 358/167 |
| 4,912,557 | 3/1990 | Faroudja | 358/167 |
| 4,953,026 | 8/1990 | Kobayashi | 358/167 |
| 4,980,767 | 12/1990 | Chao | 358/187 |
| 5,047,859 | 9/1991 | Koo | 358/187 |
| 5,111,298 | 5/1992 | Koo | 358/187 |

Primary Examiner—Howard W. Britton
Attorney, Agent, or Firm—Michael E. Marion

[57] ABSTRACT

A method and apparatus for improved ghost cancellation for use in particular in television receivers. The sequence of coefficients derived from a received GCR signal, is further processed to effect a transfer of energy from minor echo coefficients to major echo coefficients thereby improving the overall performance of the ghost cancellation device.

3 Claims, 8 Drawing Sheets

METHOD AND APPARATUS FOR COMMUNICATION CHANNEL IDENTIFICATION AND SIGNAL RESTORATION

This application is a continuation of Ser. No. 693,737, filed on Apr. 30, 1991, now U.S. Pat. No. 5,111,298, which is a continuation in part of Ser. No. 595,112, filed Oct. 9, 1990, now U.S. Pat. No. 5,047,859.

BACKGROUND OF THE INVENTION

The present invention relates to a method and apparatus for identifying the characteristics of a communication channel, and to a method and apparatus for restoring signals altered by the communication channel by using the channel characteristics information. In particular, the invention relates to a method and apparatus for substantially cancelling echoes (also referred to as "ghosts") which can occur during the transmission of television signals.

Communication engineering continually must deal with the problem of restoring a signal which has been altered by the communication channel over which the signal was transmitted. Signal restoration often can be achieved if the communication channel is fully characterized, at least as to those parameters which contribute to the signal alteration. Thus, a frequently essential component of the signal restoration problem is that of identifying the characteristics of the communication channel.

A straightforward approach to the channel identification problem is to transmit a known signal over the channel, and to receive the transmitted signal after it has passed through the channel. The originally transmitted signal is compared with the received signal, and a model of the channel characteristics is developed based on the comparison.

A good survey of the ghost cancellation problem and some theoretical solutions, can be found in W. Ciciora et al, "A Tutorial On Ghost Cancelling In Television Systems", IEEE Trans. on Consumer Elec., Vol. CE-25, No. 1, pp 9–44 (Feb. 1979) which is incorporated by reference herein.

The parent application describes a method and apparatus for restoring a received signal wherein no assumptions are made about the communication channel characteristics other than that the signal and channel interaction is described by linear system theory. Consequently, the channel is characterized completely by its impulse response. A test signal is transmitted over the channel and is received in a form distorted or otherwise altered by the channel, for example, by multipath interference. The test signal and the received test signal are related by the channel impulse response. Samples of the test signal are represented by an ensemble of sample sequences ordered in a matrix, called the test signal evolution matrix. The test signal evolution matrix changes from row to row in the manner that the test signal evolves in time. Samples of the received signal and the channel impulse response can be ordered in vectors. The channel impulse response sample vector can then be directly obtained through the multiplication of the inverse test signal evolution matrix and the received signal sample vector.

The sequence of channel impulse response function samples thus obtained by processing the test signal, serves to provide the correct sequence of coefficients to a filter which then is used to process the complete video signal in order to compensate for the channel echo and provide a substantially echo free video display.

When viewed in the time domain, the sequence of coefficients derived from a test signal reflects the concentrations of energy present in the received signal. The received signal will have one or more main echo components as well as numerous minor echo components. Most of the echo component energy is concentrated in the main echo components. The energy present in the minor echo components, while nominal for each individual minor echo component, can collectively cause a substantial amount of distortion in a television picture. Prior art echo cancellation devices utilize limiting methodology to extract from the received test signal, minor echo components which are below a certain level, for example those which are substantially close to zero. The limiting can alternatively be applied to the sequence of coefficients derived from the received test signal, rather than on the received test signal itself. The "limited" sequence of coefficients allows for the use of clustering algorithms which assign multipliers within the filter circuits, only to coefficients with non-zero values. As a result the energy present in those minor echo components which later translates into distortion in the signal, is never addressed during the processing of the complete received signal.

It is therefore an object of the instant invention to provide a method and apparatus for cancelling echoes in a manner which more effectively avoids the effects of minor echo components. It is another object of the invention to provide for effective grouping or clustering of coefficients without reducing the overall signal energy represented by those coefficients.

SUMMARY OF THE INVENTION

The instant invention provides a method and apparatus for reducing the number of coefficients related to minor echo components while redistributing their energy to increase the values of the coefficients related to the main echo components.

A test signal is received as part of a television signal, for example as part of the vertical blanking interval. It is then sampled and a sequence of coefficients is calculated resembling in the time domain, the channel characteristic signature of the echo components of the received signal. The sequence of coefficients is then transformed into the frequency domain where portions of it are copied and distributed within gaps normally present in the frequency domain spectrum due to the limitation in the bandwidth of the test signal, i.e. 4.2 MHz. The expanded frequency spectrum is then transformed back into the time domain. This process will be referred to hereinafter, as "whitening".

It is a feature of the invention that the whitened time domain sequence of coefficients displays a linear redistribution of energy from the "low level" coefficients which relate to the minor echo signal components to the "high level" coefficients which relate to the major echo signal components.

The whitening process can also be applied to the samples of the received test signal before coefficients are calculated.

The invention further comprises apparatus for performing the whitening process and an echo cancellation apparatus incorporating the whitening apparatus.

It is a feature of the instant invention that the number of low level coefficients present within the coefficient sequence is reduced. As a result, it is another feature of the invention that by so reducing the number of low level coefficients, the number of multipliers needed can be reduced thereby simplifying filter structure.

Another feature of the invention is that the value (i.e. amplitude) of the high level coefficients is increased. As a result, it is another feature of the invention that the high level coefficients are less effected by quantization errors.

It is a further feature of the invention that it improves the performance of echo cancellation circuits at the receiver and without altering the signal at its source.

Another feature of the invention is that it can be used with any type of coefficient calculating and or clustering algorithm.

The invention can be used to improve the performance of any echo cancellation system utilizing channel characterization processes, such as the frequency division method and different adaptive filter methods known to those skilled in the art, and to the matrix computational method described in the parent application.

These and other objects and features of the invention will be more fully appreciated from the following detailed description when taken in conjunction with the accompanying drawings, in which:

DETAILED DESCRIPTION OF PREFERRED EMBODIMENTS OF THE INVENTION

Normally there are two main steps involved in cancelling echoes which occur during the transmission of television signals. First the characteristics of the communication channel (which include the echo artifacts, if any) must be determined at the receiver. From these characteristics, an inverse channel characteristic is derived in the form of a sequence of filter coefficients. These coefficients are then provided to filters which are used to implement the inverse channel processing, i.e. the echo cancellation.

A received video signal contains echoes which are comprised of superimposed copies of the originally transmitted signal, which have different delay times and amplitudes. The strongest signal component represents the originally transmitted or main signal component. Looking in the time domain, any echo component occurring before the main signal component is called a "pre-echo" and any copy occurring after the main signal component is called a "post-echo".

Figure 1:
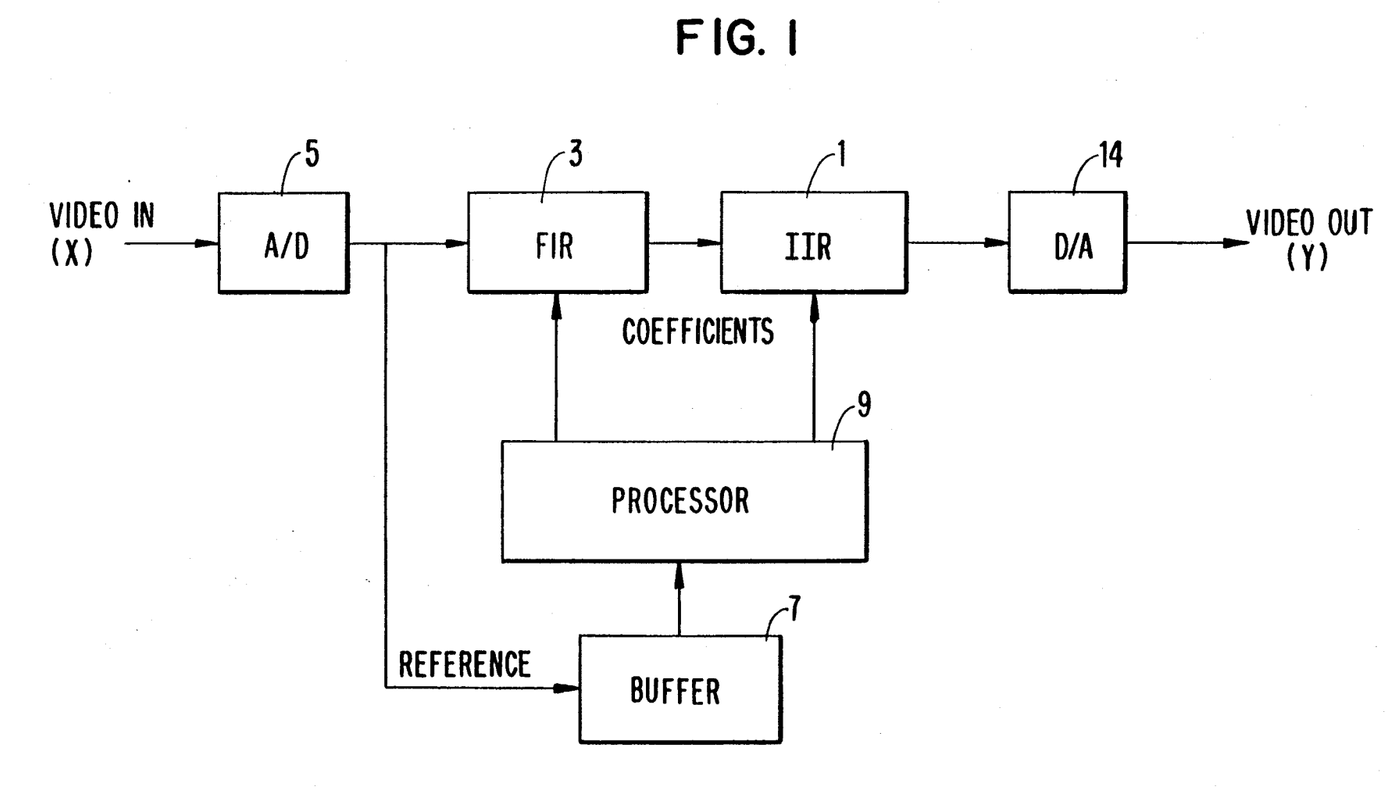
FIG. 1 is a block diagram of one embodiment of an echo cancellation circuit comprising the invention.

FIG. 1 describes an echo cancellation circuit which can be used to cancel both types of echoes. An IIR filter 1 is used to cancel post-echoes and an FIR filter 3 is used to cancel pre-echoes.

Video samples are received and input to an A/D converter 5 and a test signal commonly known as a ghost cancellation reference (GCR) signal which is transmitted during the vertical blanking interval of a television signal, is separated and fed to a buffer memory 7. This reference signal, which has been distorted according to the channel characteristics, is sometimes sampled over a number of frames, and an average of the sampled versions is then fed to processor 9 which is shown in more detail in FIG. 2. ROM 10 contains a pre-processed and stored version of the GCR as transmitted, and the contents of buffer 7 is compared to the stored version of the GCR from ROM 10 in CPU 12 and from this comparison, the impulse response of the echo channel can be modeled. This channel model is then used to compute a sequence of coefficients for the filters.

The Japanese Broadcasting Technology Association (BTA) has adopted a GCR that is the time integral of a windowed sin x/x pulse (sinc) which is transmitted on line 18 of the vertical blanking interval (VBI) of a television signal. For purposes of describing the invention herein, such a GCR signal will be used. However, the Advanced Television Systems Committee (ATSC) has expressed fear that the sinc signal may be suboptimal since the energy of this signal is very low and its performance under high noise conditions is poor. It is to be understood therefore that the instant invention can be practiced with any type of test reference signal which eventually might be chosen as a standard.

After the filter coefficients are fed to the filters, the complete television signal is processed through these filters where the echo components are substantially reduced. The output of IIR filter 1 is then fed to a digital-to-analog converter (D/A) 14 and presented as a video output signal.

Figure 3:
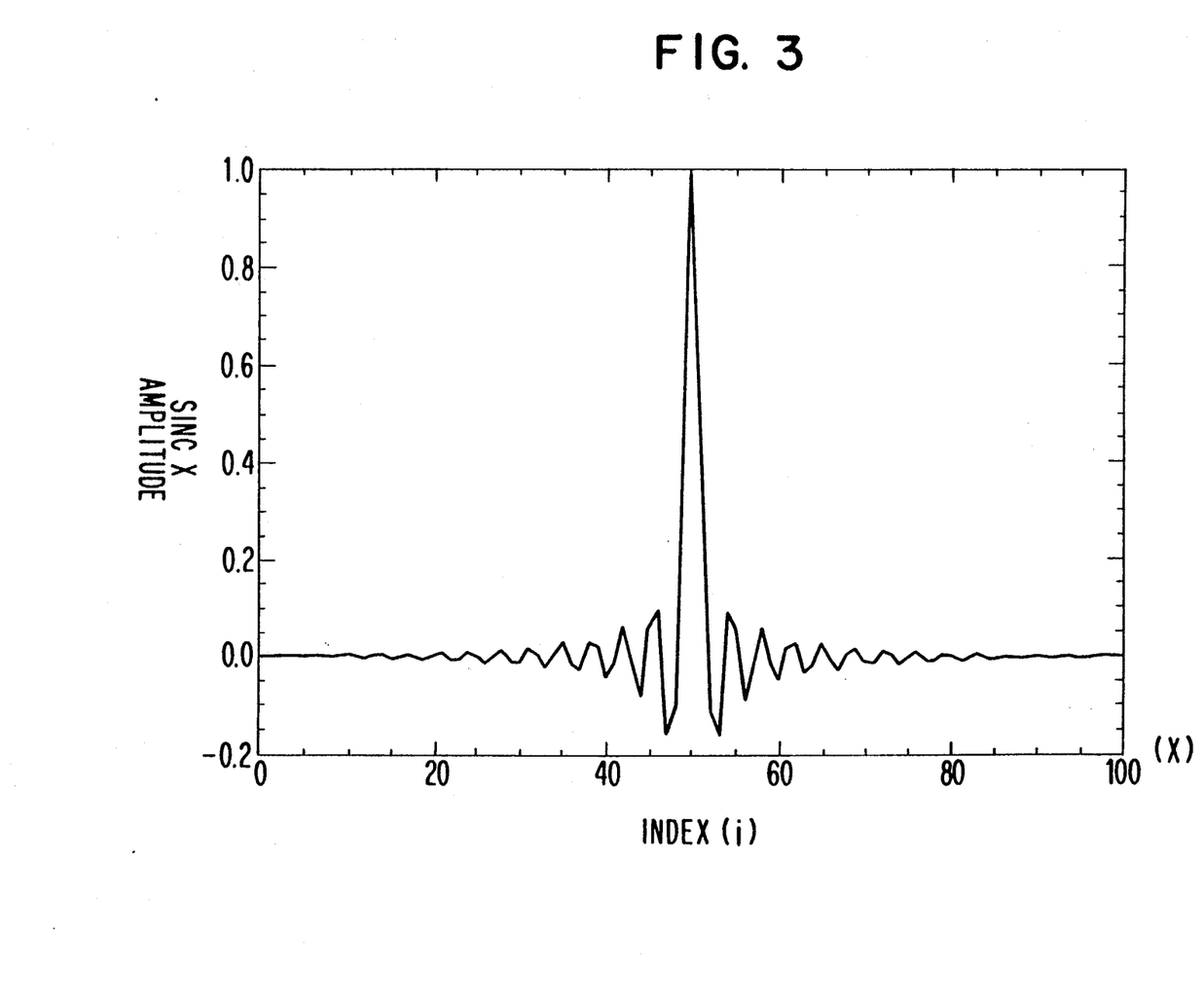
FIG. 3 is a graph of one embodiment of a test signal used in carrying out the invention.

FIG. 3 is a graph, in the time domain, of the sinc GCR signal. This is the signal as transmitted and as stored in ROM 10 and/or a processed version of which is stored in ROM 10.

Figure 4:
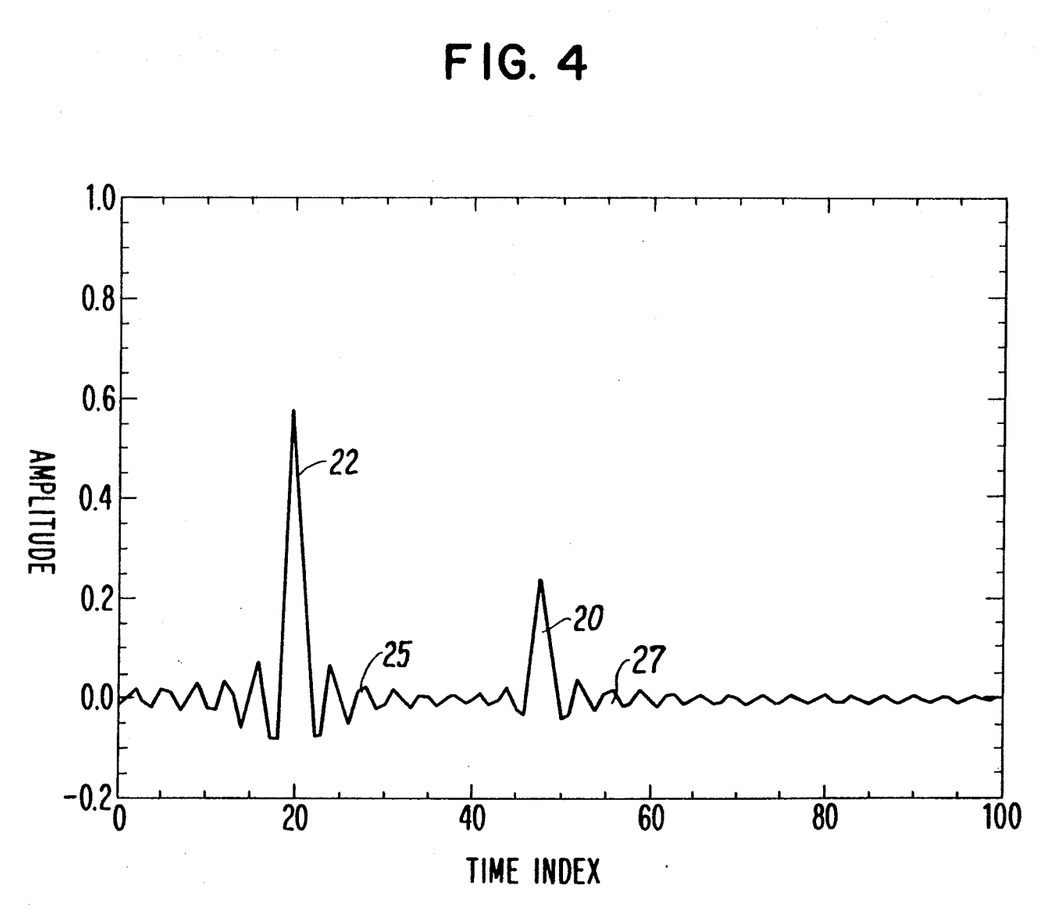
FIG. 4 is a graph of a sequence of coefficients derived from the test signal of FIG. 3 prior to the whitening process of the invention.

FIG. 4 is a graph of a sequence of coefficients derived in processor 9 from a received GCR signal as provided by buffer 7. As illustrated, the relative energy level of the coefficients along the time index of the sequence follows the shape or signature of the transmitted GCR signal; however, in this example, two main groups of coefficients are indicated (20 and 22) as well as numerous minor (i.e. low level) coefficients for example 25 and 27. The coefficients shown represent the sequence of coefficients derived for the IIR filter, using methods as described for example in the parent application.

Figure 2:
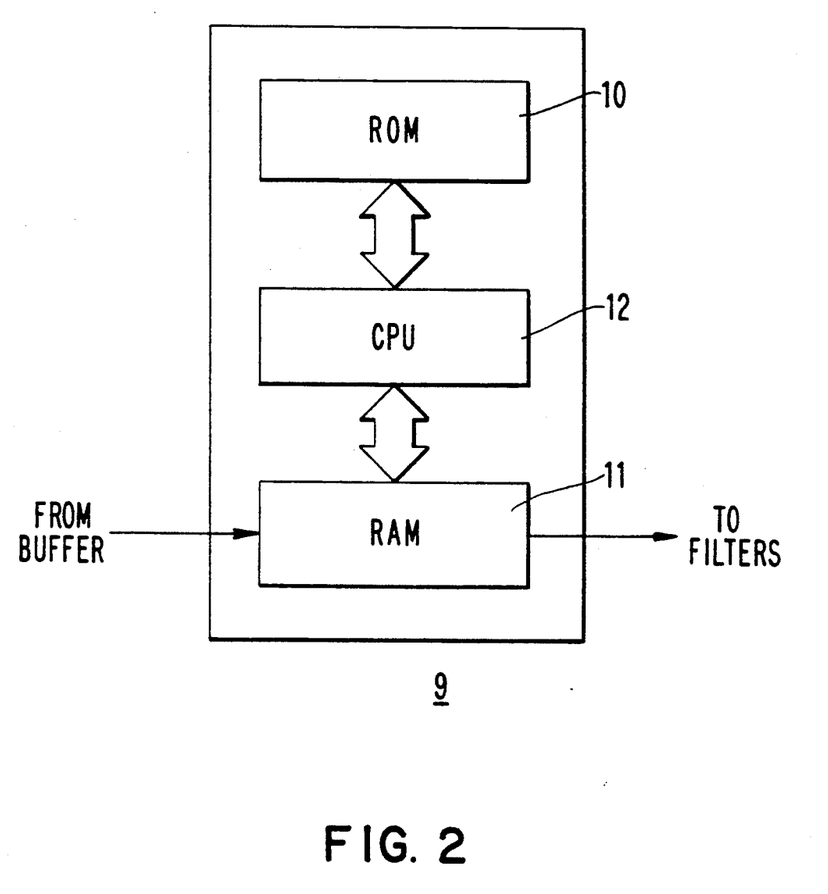
FIG. 2 is a schematic diagram of a processor for computing values of a communication channel impulse response which can also be used to implement the whitening process of the invention.

In known limiting systems, the coefficients above a certain level, for example 22 and 20, would be fed to appropriate taps of the filters. The other coefficients below that level, for example 25 and 27, would be ignored. This type of limiting causes a non linear distribution of energy, and the echoes represented by the minor coefficients 25 and 27 would never be addressed during the actual filtering process. In the instant invention however, the derived coefficient sequence is not limited in this fashion. Instead, it is subjected to an FFT (Fast Fourier Transform) process in CPU 12 to convert it into its frequency domain equivalent. Such conversion processes are commonly known to those skilled in the signal processing art and are described in more detail in references such as "Signals and Systems" by Oppenheim and Willsky, published by Prentice Hall Inc., Englewood Cliffs, N.J. and incorporated by reference herein.

Figure 5:
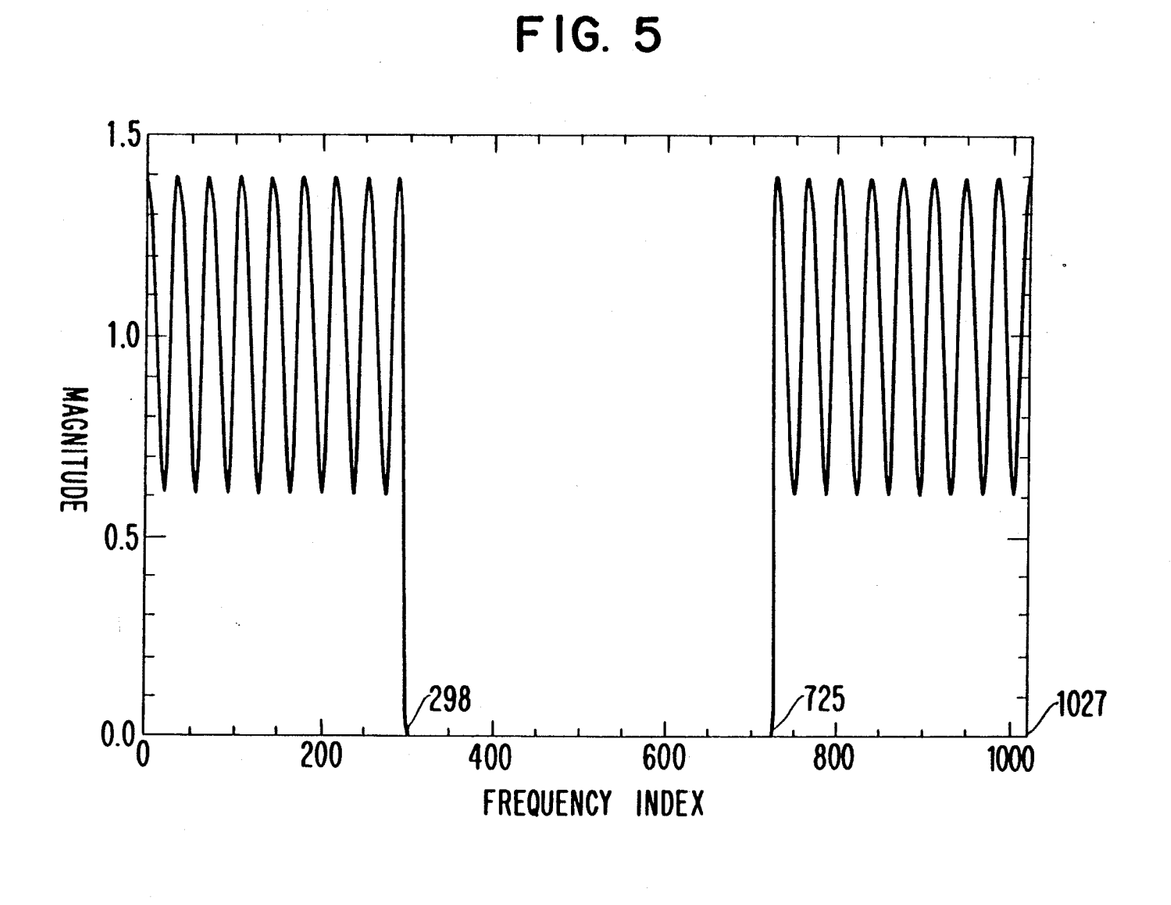
FIG. 5 is a graph of the signal of FIG. 4 after transformation into the frequency domain.
Figure 6A:
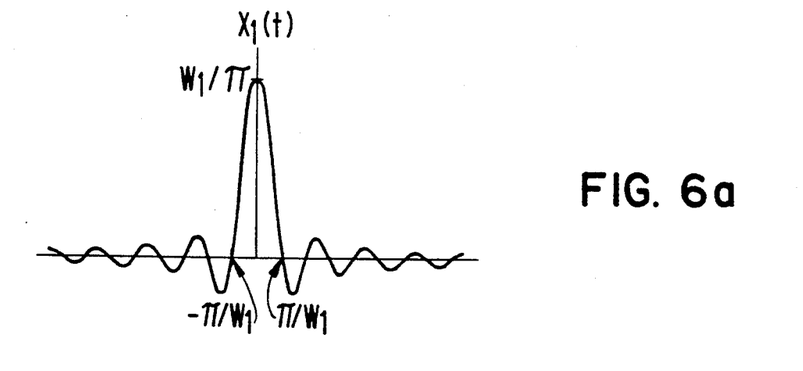
FIGS. 6a–6b describe a Fourier transform pair with a signal having first bandwidth.
Figure 6B:
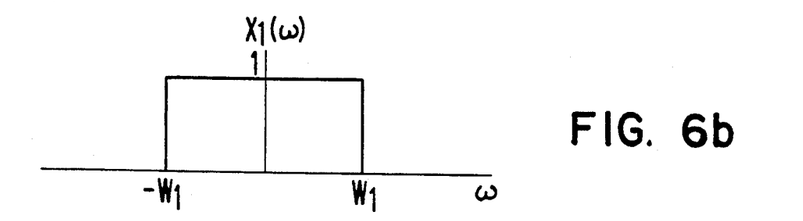
Figure 7A:
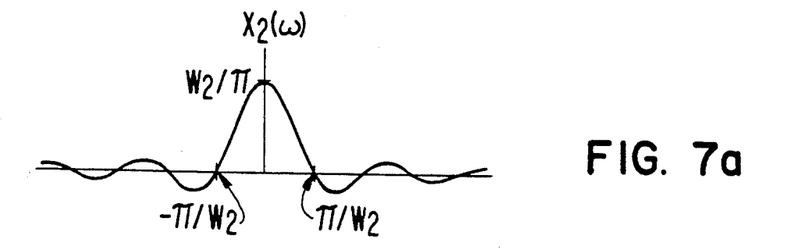
FIGS. 7a and 7b describe a second Fourier transform pair for a signal having a second bandwidth.
Figure 7B:
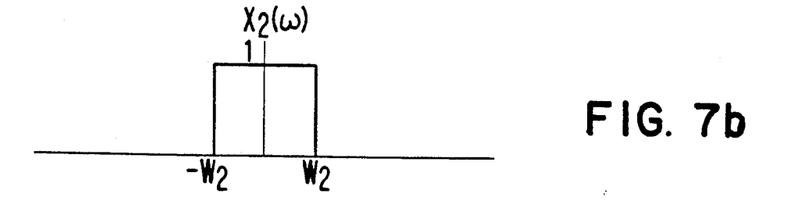
Figures 8A, 8B:
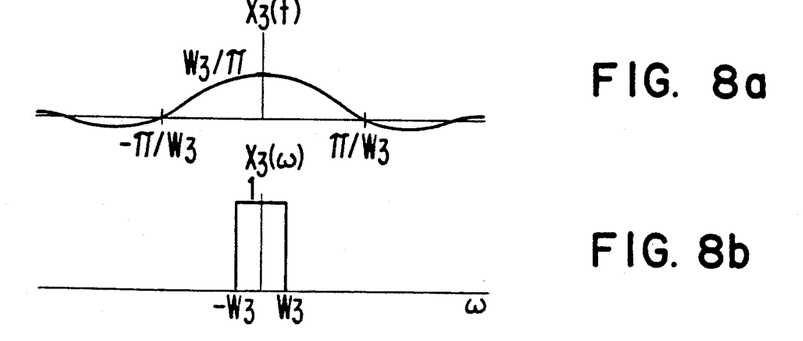
FIGS. 8a and 8b describe a third Fourier transform pair for a signal having a third bandwidth.

The bandwidth of the GCR must be limited to about 4.2 MHz because this is a bandwidth of a standard television channel, for example an NTSC channel. Any digital processing, therefore, has to be done at a sampling rate of 8.4 MHz or more in order to meet the Nyquist criterion. Often, therefore, processing of a composite baseband NTSC signal is done at a 14.32 MHz rate, which is four times the frequency of the color subcarrier. This preserves the phase relationship between a color burst and a digital video signal, and thereby the color information. FIG. 5 is a graph of the sequence shown in FIG. 4 after it has been transformed into its frequency domain equivalent. Due to the sampling frequency, the signal is repeated and a gap appears in the frequency index from about 298 to about 725. This frequency index is shown in a normalized fashion; however, 1023 could represent the 1432 MHZ sampling frequency and the gap represents a limitation in bandwidth.

Figure 9:
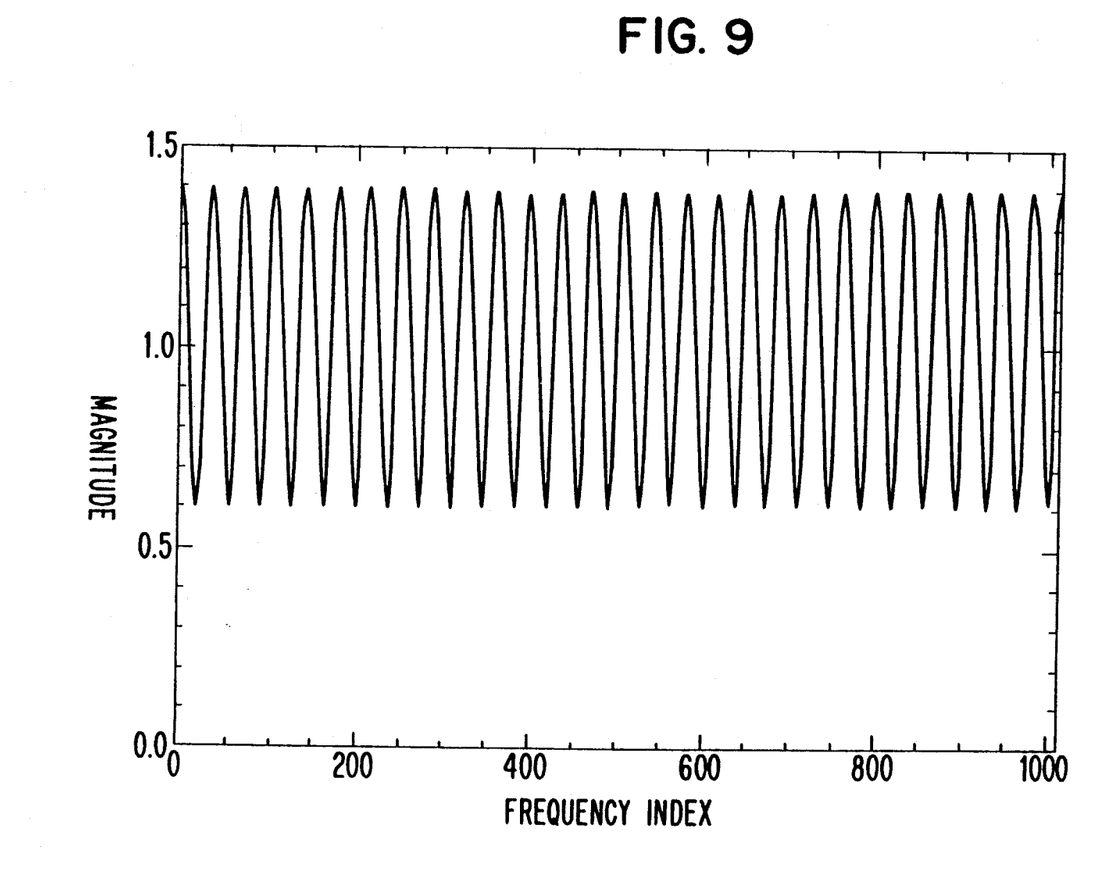
FIG. 9 is a graph of the signal of FIG. 5 after whitening.
Figure 10:
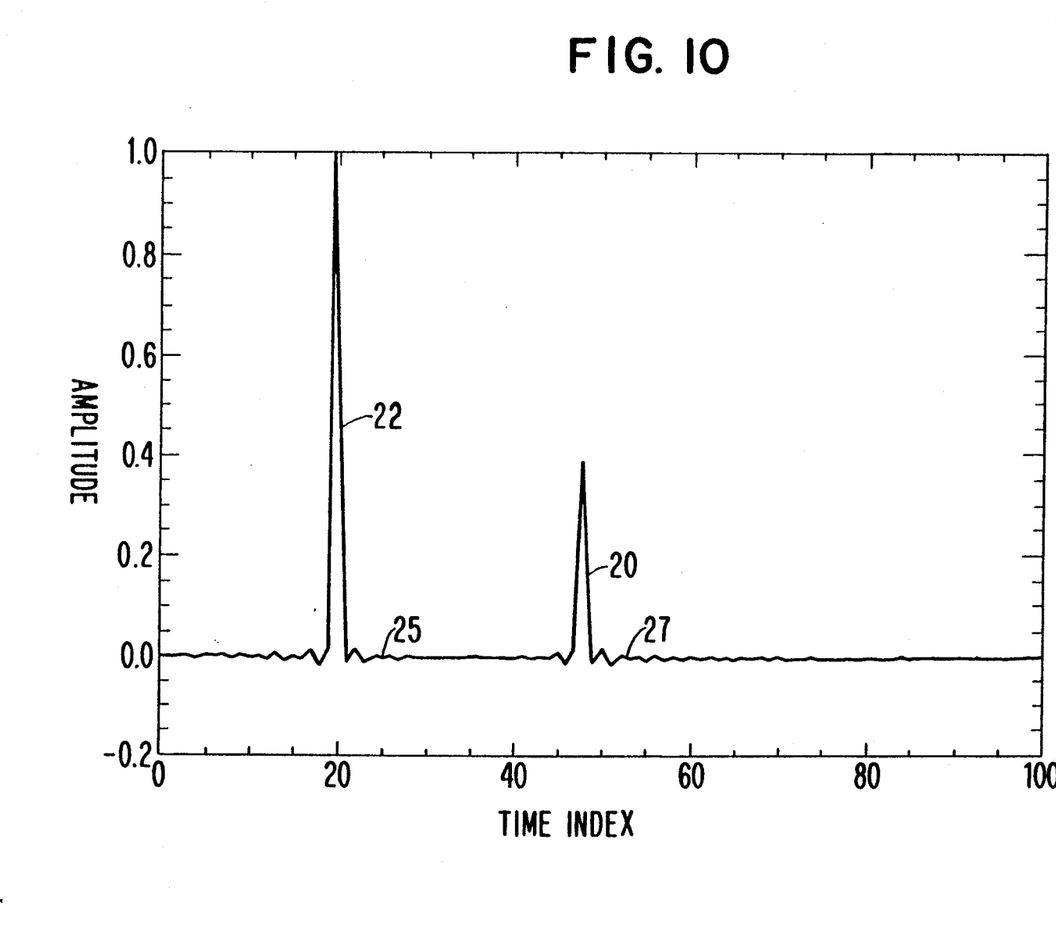
FIG. 10 is a graph of the signal of FIG. 9 after transformation back into the time domain.

FIGS. 6a and 6b, 7a and 7b and 8a and 8b describe Fourier transform pairs for three respective signals having different bandwidths. As can be seen from analyzing each of the Fourier pairs, the wider the bandwidth of the sinc signal, the more pronounced the energy concentration becomes approaching an ideal impulse response, in the time domain. This idea is applied in the instant invention in order to effectively increase the bandwidth of the derived sequence of coefficients in the frequency domain, so that when it is transformed back into the time domain, an energy distribution takes place from the minor echo coefficients to the main echo coefficients. This is accomplished for example, by using the CPU 12 instructions stored in the ROM 10, and in conjunction with RAM 11. The samples of the coefficient sequence shown in FIG. 5 are fed from the buffer 7, to RAM 11 and stored in an array, where for example, SP(i) represents each array element and where (i) is equal to from 0 to 1000. The array would then contain a value of zero for array elements SP(298) to SP(725). In accordance with the instant invention some of the values stored in array elements SP(0) to SP(297), or SP(726) to SP(1023) can be copied into those array elements which have zero values, using, for example, a simple FOR-NEXT or DO routine. It has been found that any of the non-zero values can be copied into those array elements having zero values in order to accomplish the effective result. For example the following routine could be used: FOR i=298 to 511:SP (i)=SP-(i−298):NEXT:FOR i=512 to 725:SP (i)=SP (i+298):NEXT As can be seen from FIG. 9 which describes the frequency spectrum of FIG. 5 after the whitening process, where the values present in non-zero array elements are duplicated in array levels SP(298) to SP(725), the frequency range in the frequency domain has been expanded. The whitened frequency spectrum of the coefficient sequence is then subjected to an inverse FFT process (known to those skilled in the signal processing art) in order to convert from the frequency domain back to the time domain. FIG. 10 illustrates the resulting time domain representation of this sequence of coefficients. As can be seen, main coefficients 22 and 20 have been effectively increased in energy level and narrowed in width approaching an ideal impulse response and minor coefficients 25 and 27 have substantially been reduced in level, however their energy has not been lost, but instead it has been transferred. Through the use of known clustering techniques and algorithms, the main groups of coefficients 22 and 20 can be fed to appropriate taps in filter. It has been found through experimentation that because the energy transferred to these main groups of echo components tends to compensate for the minor echo components as well, the overall performance of the cancellation process will be more effective.

Although the invention is described in detail herein in connection with the whitening of a sequence of coefficients derived for an IIR filter, it is to be understood that this process also affects any sequence of FIR coefficients which are normally derived from the FIR coefficient sequence after the whitening process.

The foregoing disclosure and description of the invention is illustrative and explanatory thereof and various changes in the methods and apparatus indicated herein may be made within the scope of the appended claims without departing from the spirit of the invention.

I claim:

1. A method for removing channel induced distortion from signals, comprising the steps of:
    a) receiving a test signal after it has passed through and been distorted by a communication channel;
    b) deriving from said received test signal a sequence of coefficients to be used with at least one filter; and
    c) widening the bandwidth of said sequence of coefficients.

2. An apparatus for removing channel induced distortion from signals, comprising:
    a) means for receiving a test signal after it is passed through and been distorted by a communication channel;
    b) means for deriving from said received test signal a sequence of coefficients to be used with at least one filter; and
    c) means for widening the bandwidth of said sequence of coefficients.

3. A television receiver comprising the apparatus as claimed in claim 2.

* * * * *